June 13, 1939.     H. C. HILL     2,162,218
OIL SEAL
Filed July 8, 1937
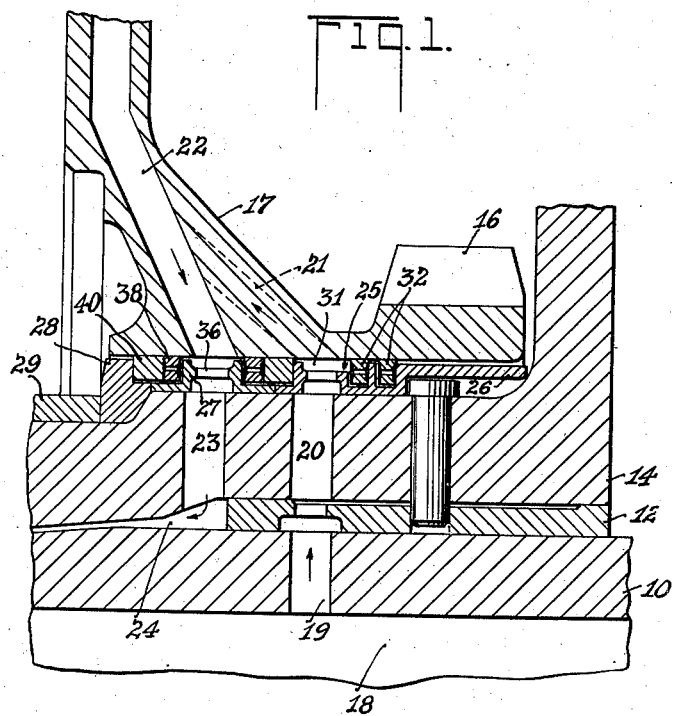
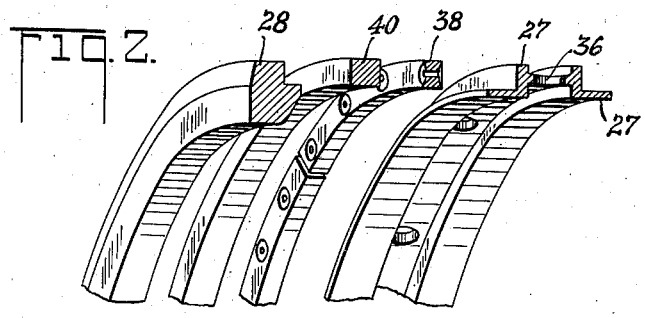
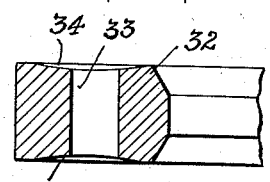
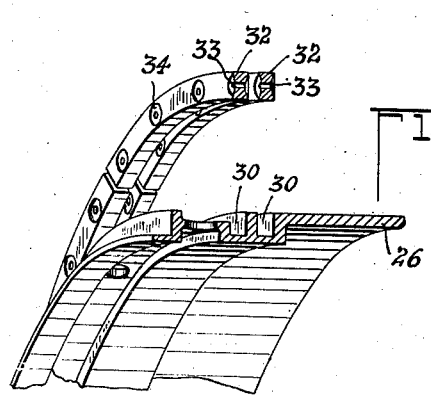
INVENTOR.
HENRY C. HILL
BY
ATTORNEY.

Patented June 13, 1939

2,162,218

UNITED STATES PATENT OFFICE 2,162,218

OIL SEAL

Henry C. Hill, Paterson, N. J., assignor to Wright Aeronautical Corporation, a corporation of New York Application July 8, 1937, Serial No. 152,555

4 Claims. (Cl. 285—1)

This invention relates to improvements in oil seals of the type wherein a rotating shaft member is provided with annular grooves in which are seated rings which bear against the cylindrical interior surface of a bearing member.

It is known that seals of this character have been used in the art and, although the simple form of seal may be satisfactory in certain environments, it has been found faulty in structures wherein very high fluid pressures are imposed on the seal, and wherein rotational speeds are high. Under these conditions, the sealing rings are prone to excessive wear, and the practical life of the rings is so short as to make the simple organization unsatisfactory. A particular environment to which an improved seal of the character herein disclosed is applicable, is in the oil transfer bearings of an aircraft engine adapted for a hydraulically controlled controllable pitch propeller. In such instance, pressures of the order of six hundred pounds per square inch must be transferred from a pump to a rotating shaft member without undue loss of pressure or fluid.

An object of the invention is to provide a novel form of oil seal ring, and to provide likewise, means for effecting automatic lubrication of the sealing faces.

A further object is to provide a compound sealing ring organization for high pressures, wherein the parts are adapted for perfect machined surfaces.

Further objects will be apparent from a reading of the subjoined specification and claims, together with an examination of the drawing, in which similar numbers indicate similar or like parts, and in which:

Fig. 1 is an axial section through a mechanism embodying the improved oil seal of this invention;

Figs. 2 and 3 are, respectively, exploded views of different portions of the sealing elements; and Fig. 4 is a cross-section through a fragment of one of the split sealing rings.

Fig. 1 represents part of the mechanism of an aircraft engine wherein 10 is a portion of the engine crankshaft, embraced by a bearing bushing 12 on which is formed a propeller shaft, shown in part as 14. Surrounding the propeller shaft 14 is a sun gear 16 mounted on an annular bracket 17 which is adapted for attachment to the engine casing, not shown. The gear 16, along with the flange shown at the right hand end of the propeller shaft 14, are parts of the engine reduction gear, not shown. The crankshaft 10 is hollow, as indicated at 18, and acts as an oil conduit delivering oil through a drilling 19, through the bushing 12 and through a drilling 20 in the propeller shaft to an oil passage 21 leading to the intake of a high pressure pump, not shown. The oil in the conduit 18 is under a moderate degree of pressure—of the order of 60 to 100 lbs. per square inch. Oil from the above mentioned high pressure pump is carried through a conduit 22 at a high pressure, through a propeller shaft drilling 23 to the space between the propeller shaft and crankshaft indicated at 24, whence it is led to a propeller control mechanism. In order to conserve the oil pressure and to prevent leakage between the propeller shaft 14 and the member 17, an oil sealing organization, designated in its entirety as 25 is utilized. This organization comprises sleeves 26 and 27 arranged in series between the member 17 and the propeller shaft, and a ring 28 cooperating with the sleeve 27, the latter ring being held in place by a portion 29 of the propeller shaft locking ring. The sleeve 26 includes a pair of ring grooves 30 inwardly disposed relatively to a duct 31 establishing communication between the drillings 20 and 21, these grooves 30 having seated therein split rings 32 to serve as oil seals. The rings 32 are provided with a plurality of circumferentially spaced through openings 33 establishing communication between the respective flat faces of the rings, and counter bores 34 serve to distribute lubricant accumulating on the ring faces over a substantial area in the ring groove. In operation, oil pressure exists in the duct 31 which would tend ordinarily to leak toward the right, as shown in Fig. 1, this leakage being prevented by the rings 32. These rings spring outwardly against the bore in the member 17 and will, normally, not rotate. The oil pressure will press the rings against the right hand faces of the respective grooves, providing a small clearance at the left hand face of each ring, and beneath each ring. This oil pressure will tend to force the rings outwardly against the bore of the member 17 to effect sealing at the bore face. The holes 33 permit of oil to pass from the left hand side of each ring to the right hand side thereof to lubricate that right hand face of each ring which rubs against the right hand groove face, still establishing a seal at this point for minimizing any oil leakage. In the prior art, rings of the type disclosed, but without oil drillings, were utilized, and it was found that the rings would tend to bind against the groove faces whereby rapid wear of the ring or groove would result. Should the ring rotate with the grooved member, rapid wear would occur on the periphery of the ring at its point of engagement with the bore surface. The rings, with oil holes, as above described, have been found to be very effective with moderate oil pressures, and wear is practically negligible over a long period of time.

The seals on each side of the high pressure oil duct 36, joining the ducts 22 and 23, comprise a still further improvement, in order to effectively prevent leakage where the very high pressure makes sealing difficult. The components of this joint are shown in Fig. 2 wherein the sleeve 27 is provided with rectangularly shaped shoulders on each side of the duct 36, engaging at their respective ends the sleeve 26 and the ring 28. When so assembled, the shoulders provide annular rectangularly profiled grooves on each side of the duct 36 within which are located split sealing rings 38 having through oil passages spaced therearound as in the case of the rings 32. This ring is on the pressure side of the joint and rests against a solid ring 40 on the low pressure side of the joint, the solid ring 40 in turn bearing upon the respective end faces of the sleeve 26 and ring 28. The solid ring, in operation, will have some clearance with respect to the bore surface of the member 17, and will tend to rotate with the respective elements 26 and 28. The rings 38, on the contrary, will tend to remain stationary, due to their spring engagement with the bore surface of the member 17, and the sealing effect of the ring 38 with the ring 40 will be substantially identical with that utilized in connection with Fig. 3. The benefit afforded by the solid ring 40 is as follows: In machining annular grooves in a member, it is very difficult to have the side faces of said grooves perfectly smooth and coplanar throughout their periphery, which characteristics are essential for producing an effective joint which will be tight against high pressure. The separate rings 40 may readily be finished to a high polish and to nearly absolute planeness, and thus afford a perfect sealing joint in cooperation with the rings 38 with respect to which they rotate.

Thus, it will be seen that the above description provides two essentially similar forms of sealing joints, both utilizing the drilled split rings, whereby lubrication may be provided against the working faces thereof. That joint which uses the perfectly formed solid ring 40 as a bearing medium is adapted for use under conditions where very high hydraulic pressures are imposed upon the joint, whereas said solid ring may be eliminated if the hydraulic pressures imposed on the joint are not so severe. However, the solid ring 40 may likewise be used in connection with the low pressure joint if so desired. When the joint is organized, as shown in the drawing, excellent results may be expected insofar as sealing is concerned, and likewise insofar as long life and freedom from wear are concerned.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In a shaft and cylinder assembly having radial drillings therein adapted for fluid transfer therebetween, a sleeve between the shaft and cylinder fixed to the shaft having a radially drilled annular portion for fluid transfer between said drillings, annular grooves in the sleeve at each end of said annular portion, split spring rings seated in said grooves and non-rotatably bearing on the cylinder, said rings being axially slidable in said cylinder under the influence of fluid pressure in said annular portion to abut the groove sides for relatively rotatable sealing contact therewith, said rings having drillings connecting the end faces thereof for transferring fluid from the non-sealing faces for lubrication of the latter.

2. In a shaft and cylinder assembly having radial drillings therein adapted for fluid transfer therebetween, a sleeve between the shaft and cylinder fixed to the shaft having a radially drilled annular portion for fluid transfer between said drillings, annular grooves in the sleeve at each end of said annular portion, split spring rings seated in said grooves and non-rotatably bearing on the cylinder, solid rings in said grooves on the side of respective split rings most remote from said radial drillings, said split and solid rings being respectively non-rotatable and rotatable with the sleeve and being axially movable in said cylinder under the influence of fluid pressure in said annular portion, the solid rings abutting and rotating each with one groove face and the split rings abutting the other solid ring faces for relative rotation and sealing, said split rings each having drillings for connecting their end faces for transferring fluid from the face nearest the annular portion to the face having sealing engagement with the solid ring face for lubrication thereof.

3. In a shaft sealing assembly, a housing having a cylindrical bore and a fluid transfer opening intermediate the bore ends, a shaft member within the bore including a fluid transfer opening in substantial alinement with the housing opening, said shaft member having an annular groove on each side of the transfer opening, and a split spring ring seated in each groove, non-rotatably engaging the bore during shaft rotation due to the spring of the ring, said ring being axially slidable in the bore and bearing at one side face on that groove side which is most remote from the transfer opening, whereby to seal the shaft member with respect to the bore, said rings having drillings connecting respective side faces thereof for transferring fluid from the non-sealing to the sealing faces for lubrication of the latter.

4. In a shaft sealing assembly, a housing having a cylindrical bore and a fluid transfer opening intermediate the bore ends, a shaft member within the bore including a fluid transfer opening in substantial alinement with the housing opening, said shaft member having an annular groove on each side of the transfer opening, a solid ring in each groove bearing at its face most remote from the transfer opening upon the most remote groove face, and a split spring ring seated in each groove between the solid ring and the transfer opening and non-rotatably engaging the bore, said spring ring being axially movable in the bore and bearing at one side face on the solid ring side nearest to the transfer opening, whereby to seal the shaft member within the bore, said spring rings having drillings connecting respective side faces for transferring fluid from the non-sealing to the sealing faces thereof for lubrication between the adjacent faces of the solid ring and spring ring.

HENRY C. HILL.